United States Patent [19]
Miller

[11] 3,808,875
[45] May 7, 1974

[54] DENSITOMETER AND PROBE THEREFOR

[75] Inventor: Charles Eveleigh Miller, Boulder, Colo.

[73] Assignee: International Telephone and Telegraph Corporation, New York, N.Y.

[22] Filed: Nov. 24, 1972

[21] Appl. No.: 309,168

[52] U.S. Cl. ................................................. 73/32
[51] Int. Cl. ............................................ G01n 9/00
[58] Field of Search ........................... 73/32, 59, 67.1

[56] References Cited
UNITED STATES PATENTS

| | | | |
|---|---|---|---|
| 3,677,067 | 6/1972 | Miller | 73/32 |
| 3,623,357 | 11/1971 | Abbotts | 73/32 |
| 3,449,940 | 6/1969 | Banks | 73/32 |

Primary Examiner—Richard C. Queisser
Assistant Examiner—Stephen A. Kreitman
Attorney, Agent, or Firm—A. Donald Stolzy

[57] ABSTRACT

A vibration densitometer comprising an electromechanical oscillator including a probe having a thin vane that is vibrated while submerged in a fluid by a magnetostrictive driver. A piezoelectric crystal mounted on the vane puts out an A.C. signal of a frequency equal to the resonant frequency of the vane, the oscillator feedback loop including an amplifier which feeds the driver coil with a signal having an A.C. component of a frequency $Af/2$ where A is one of the numbers 1 and 2. The loop provides an output signal of a frequency directly proportional to $f$ which is fed to a linearization circuit that produces an output signal directly proportional to the density of the fluid. The linearization circuit output signal is then impressed upon an indicator which, if desired, may be calibrated to read in density, which density is directly proportional to the magnitude of the linearization circuit output signal. The driver includes a magnetostrictive tube that is held in compression to vibrate the vane. The tube is held in compression by a Belleville spring. The spring provides at least four outstanding advantages. It decreases start-up time. It increases accuracy. It provides temperature compensation. It makes possible the use of a more durable housing metal.

10 Claims, 8 Drawing Figures

PATENTED MAY 7 1974

DENSITOMETER AND PROBE THEREFOR

BACKGROUND OF THE INVENTION

This invention relates to the art of producing an electrical signal which is a function of the density of a fluid, and more particularly, to vibration densitometers or the like and probes therefor for submersion in a fluid of interest.

In the past it has been the practice in vibration densitometers to employ a magnetostrictive member between a probe housing and a structure to be vibrated. A driver coil is then placed about the member and energized with a signal having an A.C. component. The member is placed in compression regardless of whether or not the coil is energized.

Because the member and the housing cannot have exactly the same thermal expansion at every temperature, the axial compression of the member varies. This adversely affects the accuracy of the densitometer. For this reason, a vibration densitometer is frequently designed to operate in a limited temperature range.

If fluid is started through a pipeline, it may take some substantial time for a vibration densitometer to indicate accurately the density of the fluid because it may take time for the temperature of the densitometer parts to rise to or fall to the designed temperature range, i.e., the temperature of the fluid.

Prior art vibration densitometer probes often utilize the same ferromagnetic material throughout to complete the magnetic circuit of the magnetostrictive driver. Unfortunately, ferromagnetic probe housings are often easily corroded or otherwise undesirably attacked by fluid chemicals.

SUMMARY OF THE INVENTION

In accordance with the present invention, the above-described and other disadvantages of the prior art are overcome by providing a spring biased magnetostrictive member in the driver of a vibration densitometer probe or the like.

It is, therefore, an advantage of the present invention that vibration densitometer start-up time is reduced.

Another advantage of the present invention is that the operating temperature range of a vibration densitometer or the like is increased.

Still another advantage of the present invention is that vibration densitometer probe housings may be made of materials which are not easily attacked by fluid chemicals.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENT

Figure 1:
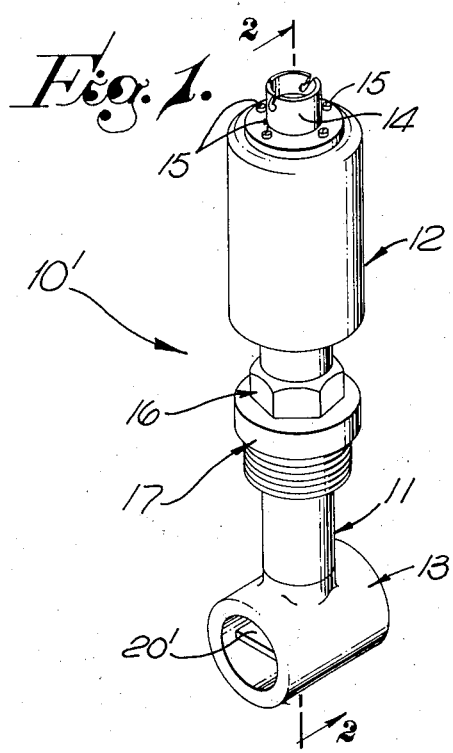
FIG. 1 is a perspective view of a densitometer probe constructed in accordance with the prior art.

FIGS. 1 to 6, inclusive, in the drawings herein and the description thereof herein will be found in U.S. Pat. No. 3,677,067. By this reference hereto, the entire disclosure of this patent is hereby incorporated herein as though fully set forth hereat. The same said incorporation is hereby made of the disclosures of copending applications Ser. Nos. 123,254; 132,312 and 187,948 filed Mar. 11, 1971; Apr. 8, 1971 and Oct. 12, 1971, respectively, and having titles DENSITOMETER, VIBRATION DENSITOMETER PROBE and FLUID SENSING SYSTEMS, respectively. All of the said copending applications were filed by Charles E. Miller, by himself except that Gerald L. Schlatter was a coinventor of said copending application Ser. No. 187,948. All or portions of the information disclosed in said patent and in all three of said copending applications not inconsistent with the following may or may not be employed in the construction of the densitometer probe of the present invention disclosed herein, as desired. Said copending applications Ser. Nos. 123,254 and 132,312 have now issued into U.S. Pat. Nos. 3,706,220 and 3,341,000, respectively.

In FIG. 1, a prior art probe is indicated at 10' having a shank 11, a housing 12 at its upper end, a tubular assembly 13 at its lower end, and an electrical connector assembly 14 at the upper end of housing 12 fixed thereto by bolts 15. Annular fittings 16 and 17 extend around shank 11 for mounting probe 10' in a hollow cylindrical extension 18 of a pipeline 19, as shown in FIG. 2.

Figure 2:
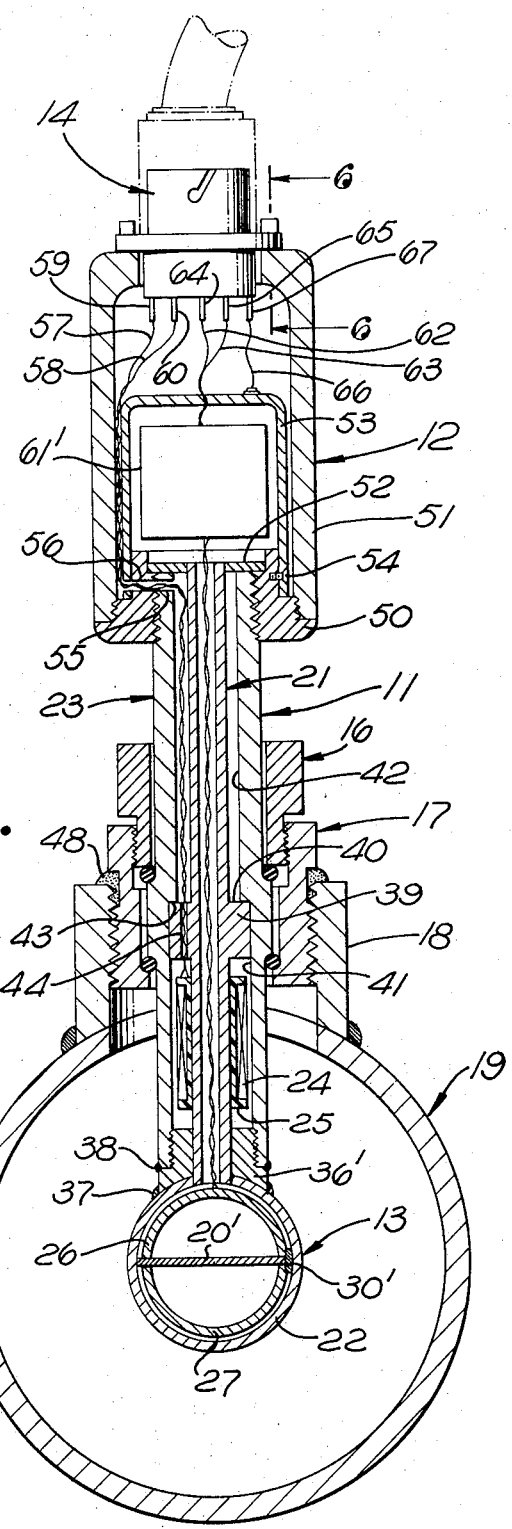
FIG. 2 is a sectional view of the probe taken on the line 2—2 shown in FIG. 1.

As shown in FIGS. 1 and 2, a stainless steel vane 20' is mounted in assembly 13 in a position perpendicular to the axis of a hollow cylindrical magnetostrictive inner tube 21. Vane 20', if desired, may be also mounted in a symmetrical position with respect to the axis of an outer sleeve 22 which houses it.

Vane 20' may be a rectangular plate having first and parallel upper and lower surfaces as shown in FIG. 2, and may otherwise have mutually normal surfaces forming a right parallelopiped.

Shank 11 not only includes inner tube 21, but an outer magnetic tube 23. A driver coil or solenoid winding 24' wound on a nylon bobbin 25 is press fit onto the external surface of inner tube 21 and located in a space between the tubes 21 and 23 toward the lower end of shank 11. Coil 24' is thus maintained in a substantially fixed position on inner tube 21, although the same is not necessarily critical to the operation of the device of the present invention.

Figure 3:
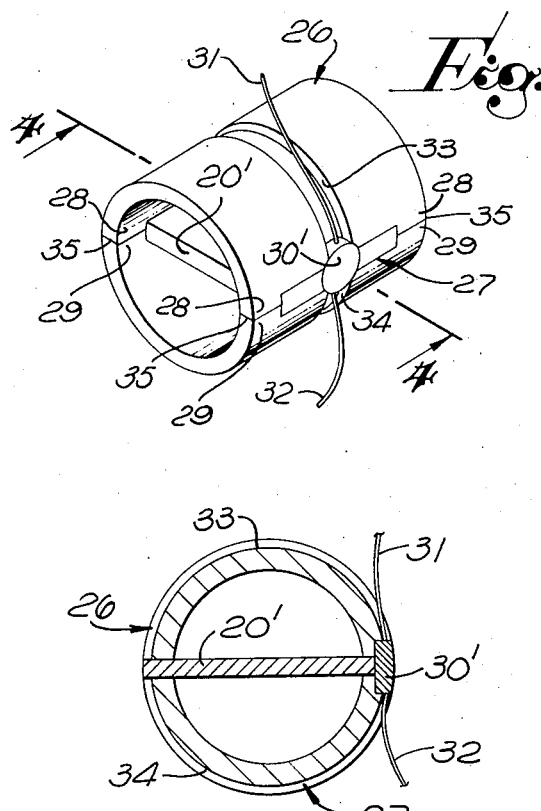
FIG. 3 is a perspective view of a group of component parts of the probe shown in FIG. 1.
Figure 4:
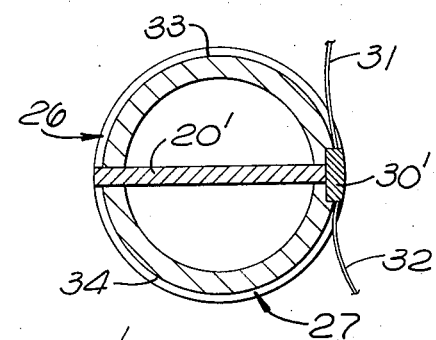
FIG. 4 is a transverse sectional view of the assembly taken on the line 4—4 shown in FIG. 3.

Vane 20' is supported between two half cylinders 26 and 27 as shown in FIGS. 2 and 3. According to the invention, the longitudinal edges of vane 20' are pressed together between half cylinders 26 and 27 with a pressure of, for example, 20,000 pounds per square inch because the assembly shown in FIG. 3 is inserted in sleeve 22 with an interference fit, sleeve 22 being heated prior to the said insertion.

Half cylinder 26 has four projections 28, and half cylinder 27 has four projections 29. Projections 28 and 29 serve to prevent longitudinal movement of vane 20' between half cylinder 26 and half cylinder 27 although the same is not likely due to the clamping pressure on vane 20' between half cylinder 26 and half cylinder 27.

Half cylinders 26 and 27, and vane 20' may be machined to have a flat or recess to receive a piezoelectric crystal 30'. Crystal 30' has electrical leads 31 and 32 which extend around half cylinders 26 and 27 in grooves 33 and 34, respectively, to a point where they enter the hollow interior of inner tube 21. This entry is made at the lower end of inner tube 21, as shown in FIG. 2.

As shown in FIG. 3, projections 28 and 29 may have a slight separation at 35 to insure that the pressure contact of half cylinders 26 and 27 on vane 20' is quite high due to the said interference fit.

As shown in FIG. 2, a boss 36' is welded at 37 to sleeve 22 in a fluid tight manner. Although the device of the present invention need not always be fluid tight throughout, a glass-to-metal seal or other seal may be provided inside inner tube 21 for leads 31 and 32. Before the said interference fit is provided, if desired, crystal 30', and those portions of leads 31 and 32 in grooves 33 and 34, respectively, may be potted with an epoxy. Further, after the interference fit has been effected, the entire unit when completely assembled may be treated further by applying a bonding agent around all of the structures inside sleeve 22. Any conventional bonding process may be employed including, but not limited to, the application of a bonding agent sold under the trade name of "Locktite."

As stated previously, boss 36' may be welded to sleeve 22 at 37 in a fluid tight manner. Further, outer tube 23 may be threaded onto boss 36' and welded thereto at 38 in a fluid tight manner. For all practical purposes, boss 36' may thus be considered an integral part of outer tube 23. Boss 36', for example, is also made of a magnetic material. All of the "magnetic materials" referred to herein may be any magnetic material including, but not limited to, stainless steel. However, inner tube 21, although being magnetic, must also be magnetostrictive. Notwithstanding this limitation, it is to be noted that inner tube 21 is employed to produce vibration, and if one feature of the present invention is used without another, the use of a magnetostrictive or magnetic material may not be required, and the invention still practiced.

Inner tube 21 has an annular projection 39 with a shoulder 40. Outer tube 23 has a lower bore 41 separated from a smaller upper counter bore 42 by an annular shoulder 43. Shoulders 40 and 43 abut. From shoulder 40 to the lower end of inner tube 21, inner tube 21 is always in axial compression. That is, inner tube 21 is in compression when coil 24' is energized, but inner tube 21 is also in compression when coil 24' is deenergized. Coil 24' is energized with an alternating current which thus merely changes the degree of compression of inner tube 21.

Projection 39 has a hole 44 through which the electrical leads of coil 24' can pass from the location of coil 24' upwardly between tubes 21 and 23.

Figure 5:
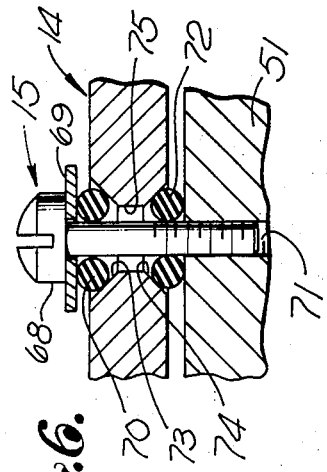
FIG. 5 is an enlarged longitudinal sectional view of a portion of the probe shown in FIG. 1.

The manner in which probe 10' is mounted in pipeline 19 is better illustrated in FIG. 5. In FIG. 5, note will be taken that outer tube 23 has an outwardly extending radial projection 45 on each side of which rubber O-rings 46 and 47 are compressed by fittings 16 and 17. Fitting 17 is threaded into extension 18 and sealed thereto by a conventional sealing compound 48 shown in FIG. 2. In FIG. 5, nte will be taken that fitting 16 is threaded inside fitting 17 at 49. The amount O-rings 46 and 47 are compressed is, therefore, determined by the position of fitting 16. That is, fitting 16 is turned, for example, by a wrench, until the desired O-ring compression is reached.

From the construction illustrated in FIG. 5, note will be taken that only O-rings 46 and 47 contact outer tube 23, and that, therefore, shank 11 is never touched by either fitting 16 or fitting 17.

The construction of probe 10' is such that the leads from coil 24' are kept magnetically separate from the leads from crystal 30'. This separation exists over a length of housing 12, as will be described. Housing 12 has a fitting 50 threaded onto outer tube 23. A cylinder 51 is threaded to fitting 50. A washer 52 is press fit and thereby is fixed in fitting 50 around inner tube 21. Inner tube 21 has an upper end which may be fixed relative to or slidable in washer 52, as desired. However, preferably the external surface of inner tube 21 at its upper end fits contiguous to or in contact with the surface of washer 52 defining the hole therethrough. A shield 53 made of a magnetic material may be fixed around fitting 50 by one or two or more screws 54. Outer tube 23 has a radial hole 55 therethrough through which the leads from coil 24' pass. Fitting 50 has a hole 56 therethrough in alignment with hole 55 through which the leads from coil 24' pass. From the outward radial extremity of hole 56, the coil leads indicated at 57 and 58 pass upwardly between cylinder 51 and shield 53 and are connected to pins 59 and 60 of the electrical connector 14, respectively. Electrical connector 14 may be a conventional five pin connector.

As stated previously, the leads 31 and 32 from crystal 30' extend upwardly through the interior of inner tube 21. At the upper end of inner tube 21, as shown in FIG. 2, leads 31 and 32 are connected to the input of differential amplifier 61'. Leads 31 and 32 thus extend outwardly through the upper opening in inner tube 21.

Differential amplifier 61' may be entirely conventional, and mounted on a conventional card, if desired. Amplifier 61' may be supported inside shield 53 by any conventional means, if desired, or simply supported by the strength of leads 31 and 32, and output leads 62 and 63 which are connected to pins 64 and 65 of connector 14, respectively. A lead 66 provides a ground connection from shield 53 to the fifth pin 67 of connector 14.

Figure 6:
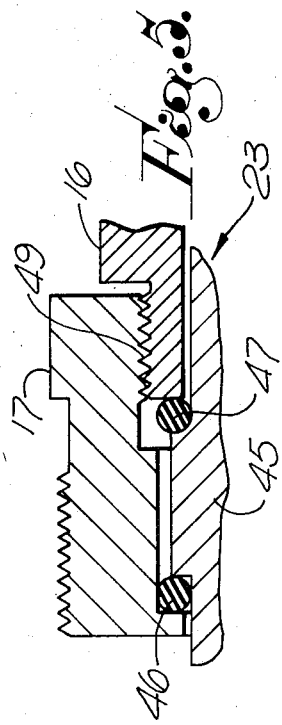
FIG. 6 is a longitudinal sectional view of a portion of mounting means for an electrical connector otherwise substantially fixed relative to the probe taken on the line 6—6 shown in FIG. 2.

The manner in which connector 14 is mounted on cylinder 51 is shown in FIG. 6. Only one bolt 15 is shown in FIG. 6 since all bolts 15 are similarly situated. In FIG. 6, bolt 15 is shown having a head 68, a washer 69 under head 68, an O-ring 70 under washer 69 and a shank 71 threaded into cylinder 51. A second O-ring 72 also extends around screw shank 71. O-ring 70 fits between the lower surface of washer 69 and a counter sunk frustoconical hole 73 in connector 14. O-ring 72 fits between the upper surface of cylinder 51 and another counter sunk frustoconical hole 74 in connector 14. Holes 73 and 74 are connected by a bore 75. From FIG. 6, it will be noted that all the structures shown therein may vibrate, but that the amount of vibration transmitted to connector 14 may be quite small.

Figure 7:
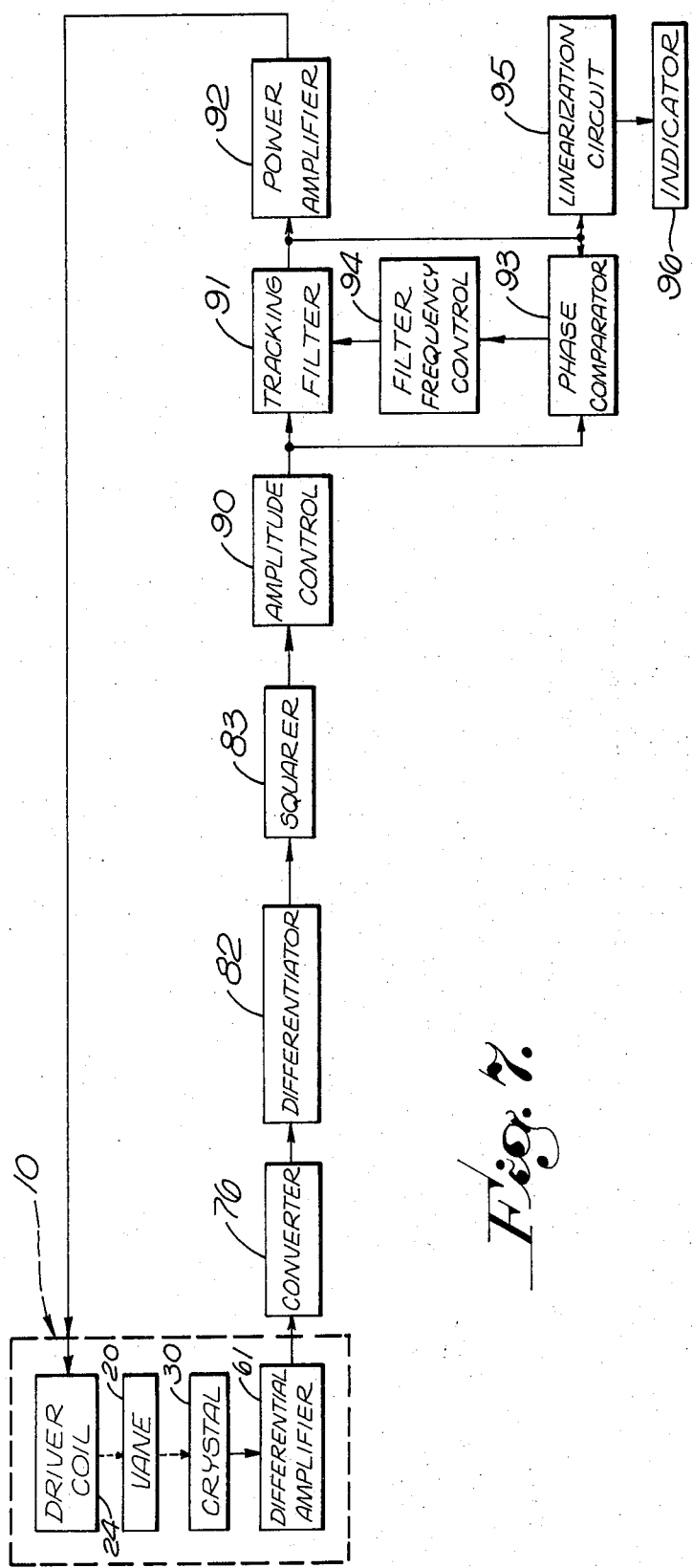
FIG. 7 is a block diagram of a densitometer constructed in accordance with the present invention.

One embodiment of the densitometer of the present invention is illustrated in FIG. 7. A probe 10 different from probe 10' is indicated as is a driver coil 24, a crystal 30 and a differential amplifier 61.

Coil 24, vane 20, crystal 30 and differential amplifier 61 may, if desired, be identical to coil 24', vane 20', crystal 30' and amplifier 61', respectively.

A current-to-voltage converter 76 is connected from amplifier 61. Converter 76 may be identical, if desired, to that shown in the said patent. Converter 76 may also be entirely conventional.

In FIG. 7, a differentiator 82 is connected from converter 76 to a squarer 83. Differentiator 82 may be identical to that shown in the said patent and may likewise be entirely conventional.

The input to differentiator 82 is mainly a sine wave voltage having a frequency which is equal to the resonant frequency detected by crystal 30. As is conventional, differentiator 82 then produces a sine wave voltage shifted in phase by 90° from the input sine wave voltage and proportional in amplitude to the absolute value of the input frequency. The output sine wave voltage of the differentiator 82 is then converted to a square wave by squarer 83. Because units of time are not equal to units of potential, the phrase "square wave" is, therefore, defined for use herein and in the claims to mean a voltage wave which abruptly arises to a maximum value and stays constant over half the period thereof, and then abruptly drops, for example, with an almost infinite slope again to its minimum value. The square wave then remains at its minimum value for half of its period. Thus, a square wave may have any maximum amplitude and any minimum amplitude without regard to its period or frequency.

An amplitude control 90, a tracking filter 91 and a power amplifier 92 are successively connected from squarer 83 to driver coil 24. Control 90, filter 91 and amplifier 92 may be respectively identical to the control, filter and power amplifier disclosed in the said patent. A phase comparator 93 receives one input from the output of control 90, another input from the output of filter 91 and supplies an input to a filter frequency control 94. The output of the control 94 is employed to vary electrically the frequency location of the passband of filter 91 to straddle the frequency of the fundamental of the square wave output of control 90.

Amplitude control 90 may simply be a voltage divider to reduce the amplitude of the output signal of squarer 83 to a desired value. Note that if all of the blocks of the system of FIG. 7 previously described operate as an electromagnetic oscillator, the oscillation amplitude may increase to infinity at which or before which some of the component parts may fail. Thus, to put a finite limit on the amount of feedback to driver coil 24, control 90 is provided.

Phase comparator 93 is entirely conventional.

In FIG. 7, the output of filter 91 is impressed upon a linearization circuit 95. The output of circuit 95 is impressed upon an indicator 96, which may be a voltmeter linearly calibrated in density.

If desired, so that phase comparator 93 may receive a stronger input signal, the output of squarer 83 may be connected to comparator 93, and the input thereto from the output of amplitude control 90 may be omitted. Similarly, the connection between the output of filter 91 and comparator 93 may be omitted and squarer may be connected from the output of filter 91 to the right-hand input of comparator 93, as shown in FIG. 7. If the squarer is inserted, the linearization circuit 95 may also receive its output.

Comparator 93, control 94, linearization circuit 95 and indicator 96 may, if desired, be identical to the respective comparator control, circuit and indicator disclosed in the said patent.

Figure 8:
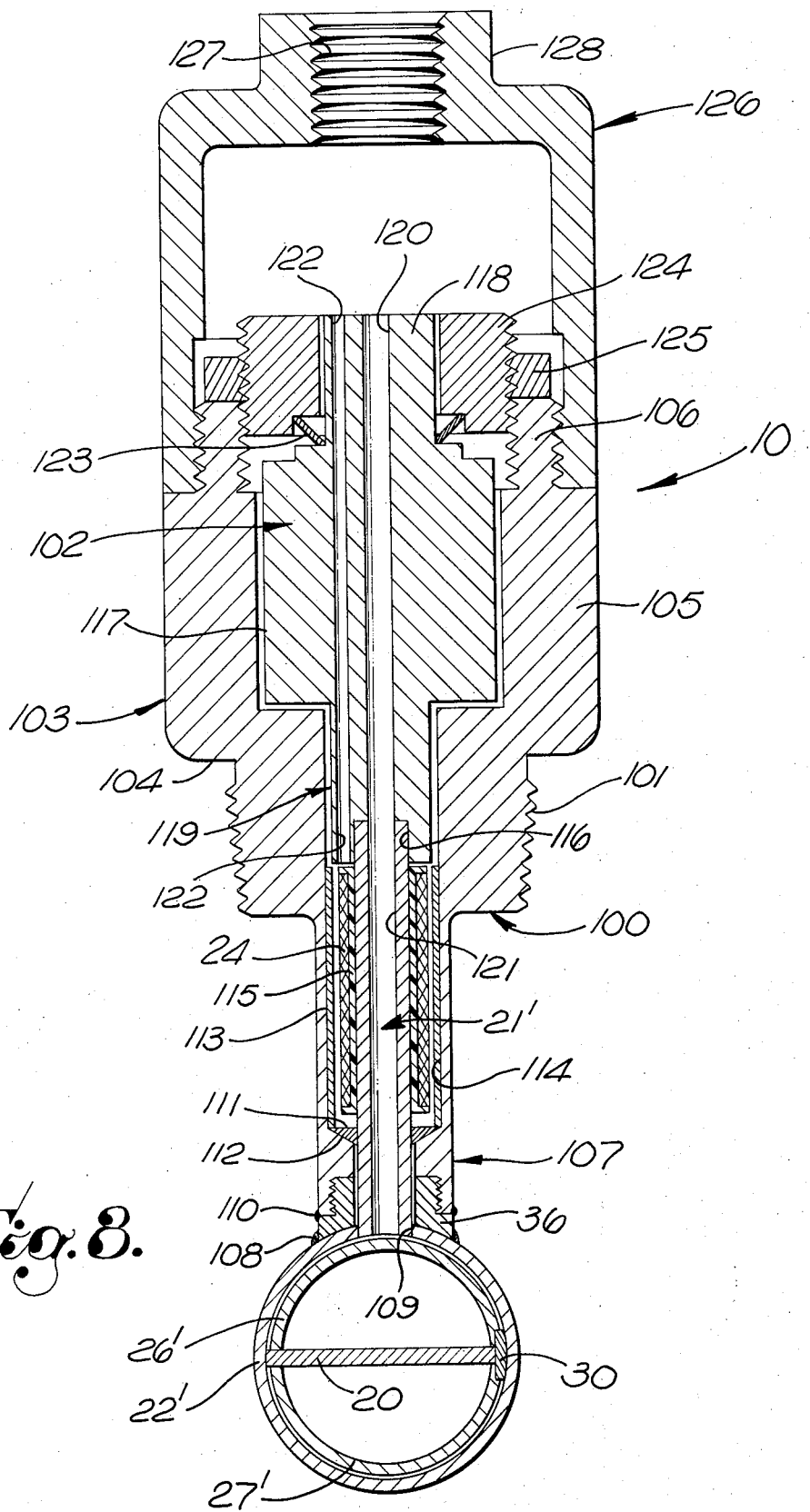
FIG. 8 is a vertical sectional view, partly in elevation, of a densitometer probe constructed in accordance with the present invention.

In operation, in lieu of probe 10', probe 10 shown in FIG. 8 has a boss 100 with a thread 101 which may be screwed into pipe boss 18 and sealed thereto as at 48 in FIG. 2.

OPERATION

In the operation of the densitometer shown in FIG. 7, ambient noise will cause detector 30 to pick up signals in a band of frequencies including the resonant frequency of the electromagnetic oscillator. That is, signals will be amplified by amplifier 61, converted from a current to a voltage by converter 76, and differentiated by differentiator 82. The output of differentiator 82 will thus be a sine wave which is converted into a square wave by squarer 83. Amplitude control 90 may be used to reduce the output of squarer 83 to a limiting value. The frequency location of the passband of tracking filter 91 will then be varied by filter frequency control 94 to follow or pass the fundamental frequency of the output of control 90 to power amplifier 92 with a minimum attenuation. The frequency location of the passband of tracking filter 91 thus will be controlled in accordance with its input from control 94. This will also be done in accordance with the difference between the phases of the output signals of control 90 and filter 91 by phase comparator 93. Power amplifier 92 will then drive coil 24 with a signal in phase with the resonant frequency signal output of detector 30 and with a small D.C. offset described in the said patent and described in said copending application Ser. No. 187,948. If desired, amplifier 92 may contain all the structure necessary to produce the same output signal that the driver amplifier of Ser. No. 187,948 produces.

The vibration produced by coil 24 will then increase in amplitude until limited by amplitude control 90. At this time, the amplitude of the vibration will reach an approximately quiescent level. Should fluid be flowing in pipeline 19 with probe 10 screwed therein, and should the density of the fluid change, the frequency of the output signal of tracking filter 91 will also change. Linearization circuit 95 will then produce a D.C. output voltage directly proportional to density. Indicator or voltmeter 96 may then be read directly when calibrated in density.

Note will be taken that parts of the probe 10 are vibrated because the alternating signal applied to coil 24, as shown in FIG. 8, will place varying amounts of radial compression on half cylinders 26', inner tube 21' expanding and contracting axially between the upper end of tube 21' and the abutment of inner tube 21' at its lower end with its half cylinder 26'.

It is an advantage of the device of the present invention that differentiator amplifier 61 and converter 76 is used. For example, converter 76 may be located a great distance from probe 10. Converter 76 has a low resistance input and is thus a ground input device. The accuracy by which the resonant frequency signal output of detector 30 is transmitted to converter 76 is not affected by longitudinal transmission line between probe 10 and converter 76. That is, the ground magnitude is accurate regardless of the length of line. The voltage drop along the line, therefore, does not affect the accuracy when the resonant frequency signal is transmitted to converter 76 from differential amplifier 61. The rejection of external noise is also limited.

An interference fit of sleeve 22' on half cylinders 26' and 27' is employed to improve efficiency and accuracy, as before. The use of crystal 30 also makes it possible to employ a vibrating structure which is very small. There is a continuous compression fit of inner tube 21' between member 102 and the upper side of half cylinder 26', as before. This, therefore, improves vibration efficiency, as before.

Differentiator 82 acts, more or less, as a high pass filter. If the amplitude of output signals of differentiator 82 are plotted as a function of frequency, this amplitude would be substantially a straight line of a predetermined positive slope, amplitude being indicated positive vertically upward on the ordinant, and frequency being indicated positive to the right. In spite of the fact that differentiator 82 acts as a very good high pass filter, it provides a constant 90° phase shift of input signals thereto. Tracking filter 91 conveniently also provides such a phase shift at the frequency at which signals are attenuated the least. Differentiator 82 and tracking filter 91 provide a phase shift in the same direction, i.e., lead or lag. This means that the output of power amplifier 92 is an alternating signal which may be adjusted in phase, i.e., 180° or zero, simply by reversing the leads from driver coil 24 connected therefrom. An in-phase drive is to be effected.

Note will be taken that one feature of the invention may be used without any of the other features. Moreover, any one feature may be used with any one or more or all of the other features. The invention, therefore, is not to be limited to any one feature.

In FIG. 8, probe 10 is shown including a housing 103 which includes boss 100 integral therewith which projects below a shoulder 104. Alternative to the sealing compound at 48, shown in FIG. 2, if desired, the topmost surface of boss 18 in FIG. 2 may be provided with an O-ring groove and an O-ring located therein for sealing engagement with shoulder 104.

As shown in FIG. 8, housing 103 has an intermediate portion 105 integral with boss 100, and an upper portion 106 integral with intermediate portion 105, upper portion 106 being threaded both internally and externally.

Housing 103 also has a lower portion 107 integral with boss 100, lower portion 107 being threaded onto a boss 36.

The entire construction of probe 10 below a plane through the top surface of boss 36 may be identical to the construction of probe 10' below a plane through the top surface of boss 36' shown in FIG. 2, if desired. Thus, vane 20 and crystal 30 are shown in FIG. 8 in the same respective locations of vane 20' and crystal 30' in FIG. 2. Also in FIG. 8, half cylinders 26' and 27' are provided in the respective positions of half cylinders 26 and 27 in FIG. 2. The size, shape and location of sleeve 22' in FIG. 8 may also be identical to the respective size, shape and location of sleeve 22 in FIG. 2.

As before, boss 36 is fixed relative to and sealed to sleeve 22' at 108 around a hole 109 through sleeve 22'.

Boss 36 is fixed to and sealed around the lower portion 107 of housing 103 at 110.

The lower end of inner tube 21' lies in abutment with half cylinder 26', as before. The lower end of inner tube 21' is easily slidable through hole 109. However, as before, inner tube 21' is always maintained in axial compression regardless of whether or not coil 24 is energized.

Preferably, housing 103 is made of 316 stainless steel or other material having a thermal expansion coefficient different from 416 stainless steel or Ni-Span-C. This type of stainless steel has a high resistance to deterioration because of contact therewith of many materials, e.g., it is noncorrosive. However, this type of stainless steel is effectively nonmagnetic. For this reason, preferably, a ferromagnetic washer 111 is fixed on a frustoconical seat 112 in lower portion 107 of housing 103. Further, a ferromagnetic sleeve 113 is press fit into a bore 114 in housing lower portion 107 to the position shown.

As before, inner tube 21' is both ferromagnetic and magnetostrictive.

As before, if desired, a nylon spool 115 is press fit onto the exterior of inner tube 21'. The sizes, shapes and locations relative to inner tube 21' of coil 24 and spool 115 may or may not be, as desired, identical to the sizes, shapes and locations of coil 24' and spool 25 relative to inner tube 21; provided, however, that this statement does not apply to the axial positions of the coil 24 and the spool 115. If desired, the axial positions of coil 24 and spool 115 may be as shown in FIG. 8. FIG. 8 may, if desired, be considered a scale drawing which is one and one-half times full size.

Note will be taken that inner tube 21' in FIG. 8 is easily slidable not only through washer 111 but also through the lower portion 107 of housing 103, through boss 36, and through hole 109 in sleeve 22'.

As shown in FIG. 8, the upper end of inner tube 21' is press fit in a bore 116 in the lower end of member 102. Member 102 has an intermediate portion 117, an upper portion 118 and a lower portion 119, all of the portions 117, 118 and 119 being integral with one another. Lower portion 119 has the bore 116 therein.

Many of the parts of the probe 10 shown in FIG. 8 may have approximately polar symmetry about a generally vertial axis, as viewed in FIG. 8, in the plane of the paper, this axis being the same as the axis of the external surface of housing portion 107 which is cylindrical.

From the foregoing, it will be appreciated that all vertical external surfaces of member 102 may be cylindrical and have the same said axis of symmetry. The diameter of the external surface of lower portion 119 of member 102 is thus smaller than the outside diameter of intermediate portion 117 thereof.

Member 102 has a hole 120 extending completely therethrough in a vertical direction, the hole 120 being defined by a cylindrical surface which has the same said symmetrical axis. If desired, the diameter of hole 120 may be equal to the inside diameter of a hole 121 which extends completely through inner tube 21' in a vertical direction. Inner tube hole 121 thus is defined by a surface which is also cylindrical and has the same said axis of symmetry.

Member 102 also has a hole 122 eccentric to the said symmetrical axis and spaced from the hole 120. The leads from coil 24 may be threaded through hole 122. As before, the leads from crystal 30 may be threaded through inner tube hole 121 and member hole 120. Differential amplifier 61 may be carried in probe 10 above member 102 inside a cap 126, as before.

Member 102 does not touch any structure whatsoever inside or outside a probe 10 with the exception of two structures. One of these structures is inner tube 21' where the upper end thereof is press fit into bore 116 of member lower portion 119. The other structure is a conventional Belleville spring 123. Member 102 is made of a ferromagnetic material.

Inner tube 21' is held in compression by a ferrule 124 which is threaded inside of upper portion 106 of housing 103 and fixed there by a jam nut 125. Jam nut 125 is threaded to the exterior of ferrule 124, and is run down tight to the top surface of upper portion 106 of housing 103. Ferrule 124 is screwed down far enough inside housing upper portion 106 to cause Belleville spring 123 to be in compression regardless of whether or not coil 24 is energized or deenergized.

The cap 126 is threaded over the housing upper portion 106. A conventional electrical conduit may be threaded into cap 126, if desired, a thread 127 being provided therefor inside a boss 128 integral with cap 126.

The leads of coil 24 and crystal 30 are not illustrated in FIG. 8 for clarity. However, it is obvious how they may be employed from the drawing and description herein of FIG. 2. The type and location of amplifier 61 above member 102 inside cap 126 has already been described.

According to an outstanding feature of the present invention, the more complicated resilient mount of the probe 10', shown in FIG. 2, is avoided by the construction shown in FIG. 8.

Tube 21' lies in engagement with an upper portion of the external cylindrical surface of cylinder 26', as before. However, the lower end of tube 21' is not bonded to the cylinder 26'. Neither is tube 21 bonded to cylinder 26.

Although it is not critical which particular types of magnetic materials are employed for member 102 and what types of materials are employed for housing 103 and tube 21', preferably, tube 21' is made of Ni-Span-C which normally has a density between 2.89 and 2.91 pounds per cubic inch. Preferably, member 102 is made of a magnetic material such as 416 stainless steel which has a density of about 2.78 pounds per cubic inch. Such 416 stainless steel is magnetic.

Note will be taken that member 102 is much larger than tube 21'. It is much larger both in volume and in weight. That is, member 102 has a mass which is substantially larger than that of tube 21'. For example, the mass of member 102 may be several times as large as that of tube 21'. Further, the mass of member 102 may be less than, equal to or greater than 10 to 80 times that of tube 21'.

One mechanism of the improvement in accuracy is not known, but it is known that the use of member 102 with a mass larger than that of tube 21' prevents any substantial frequency error which, in turn, would otherwise result in an inaccurate density indication or the production of an inaccurate density analog signal for use in a process controller or otherwise.

Note will be taken that half cylinders 26' and 27', shown in FIG. 8, may be integral with one another and/or with vane 20 or bonded thereto as disclosed in said copending applications Ser. Nos. 123,254 and 132,312. Thus, vane 20, shown in FIG. 8, which may be identical to vane 20' in FIG. 2, may either be clamped between or bonded to cylinders 26' and 27'.

Probe 10, if desired, may be employed in lieu of the probe in the apparatus of copending application Ser. No. 270,335 filed July 10, 1972, by G. L. Schlatter for DENSITOMETER. By this reference hereto, the entire disclosure of the said copending application Ser. No. 270,335 is, therefore, hereby incorporated herein as though fully set forth hereat.

If the embodiment of the invention illustrated in FIG. 7 is employed, the alternating component of the output of amplifier 92 is $f$, where $f$ is the frequency of the output of crystal 30. When probe 10 is used in lieu of that disclosed in copending application Ser. No. 270,335, the output of the driver or power amplifier is $f/2$. Thus, in the generic case, the coil input is $Af/2$ where A is one of the numbers 1 and 2.

Note will be taken that in FIG. 8, ferrule 124 has a portion between where the upper edge of spring 123 engaged it and a point along the length thereof where it is fixed relative to housing 103 by the threaded engagement thereof with housing 103 and jam nut 125.

Note will also be taken that in FIG. 8, member 102 has a portion from where the lower edge of spring 123 engages it to the lower end of housing portion 119. This portion has a mass which is larger than and which is substantially larger than that of tube 21'. Typically, but not necessarily, member 102 and tube 21' may have lengths which are of the same order of magnitude. Member 102 has an average cross-sectional area substantially larger than that of tube 21'.

The phrase "utilization means" is hereby defined for use herein and in the claims to include, but not be limited to, a voltmeter whether or not calibrated in density, an ammeter or milliammeter whether or not calibrated in density, a process controller, or otherwise.

If a voltage-to-current converter is connected between circuit 95 and indicator 96 in FIG. 7, indicator 96 may be a milliammeter or ammeter whether or not calibrated in density.

When indicator 96 is a voltmeter, it may or may not be calibrated in density, as desired.

A process controller may be connected directly from circuit 95 in lieu of indicator 96, if desired.

The word "density" is hereby defined for use herein and in the claims to include, but not be limited to, specific gravity because specific gravity is simply density divided by the density of water which is a constant.

What is claimed is:

1. A vibration densitometer comprising: an electromechanical oscillator including a probe, said probe including a housing, a structure to be vibrated while submerged in a fluid, said structure being mounted on said housing, a first member fixed relative to said housing, a second member, a magnetostrictive third member having one end guided into engagement with said structure, the other end of said third member being fixed rigidly with one end of said second member, spring means connected with both said first member and said second member in a position holding said second and third members in compression with said one end of said third member in pressure contact with said structure, a driver coil mounted around said third member between said second member and said structure, a pick-up mounted on said structure having an alternating signal at its output, when energized, of a frequency equal to the resonant frequency $f$ of said structure, a feedback loop connected from the output of said pickup to said coil to impress a signal on said coil having an alternating component of a frequency $Af/2$ where A is one of the numbers 1 and 2, said loop including first means to produce an output signal of a frequency directly proportional to $f$, said loop also including an amplifier of a gain adequate to cause said structure to vibrate continuously at said resonant frequency; and utilization means connected from said means to receive said output signal thereof.

2. The invention as defined in claim 1, wherein said structure includes a generally rectangular flat vane having a thickness small in comparison to its length and width, said vane being fixed at two opposite parallel edges to a hollow inner cylinder approximately at two respective diametrically opposite axial lines on the inner cylindrical surface thereof, said inner cylinder having a substantially uniform wall thickness around its circumference and along its length, an outer right cylinder around said inner cylinder, said outer cylinder being fixed relative to said housing an having concentric internal and external cylindrical surfaces, the unstressed inside diameter of said outer cylinder being less than the unstressed outside diameter of said inner cylinder such that said inner and outer cylinders have an interference fit when they are both at the same temperature, said pick-up being a piezoelectric crystal fixed between said cylinders at one edge of said vane midway along the length thereof, said third member including a body having a cylindrical external surface with an axis of symmetry perpendicular to the plane of said vane intersecting said vane at its center, said sleeve having a hole through the wall thereof defined by a cylindrical surface into which said one end of said third member is slidably positioned upon assembly, said coil being fixed relative to said third member, said spring means including a Belleville spring having parallel frustoconical surfaces defined between parallel planes perpendicular to the axis thereof, said first member having a first surface facing said second member, said first member having a cylindrical internal surface, said second member having a projection with an external cylindrical surface, said projection extending at least part way into said hole, said first member internal surface and said second projection external surface being concentric and having the same said axis of symmetry, the outside diameter of said projection being slightly less than the minimum inside diameter of said spring, said projection extending through said spring, said first member having an annular notch in which the outer annular edge of said spring is fixedly located.

3. A vibration densitometer probe comprising: a housing; a structure to be vibrated while submerged in a fluid, said structure being mounted on said housing; a first member attached rigidly to said housing; a second member; a magnetostrictive third member having one end guided into engagement with said structure, the other end of said third member being attached rigidly to one end of said second member; a spring means connected with both said first member and said second member in a position holding said second and third members in compression with said one end of said third member in pressure contact with said structure; a driver coil mounted around said third member between said second member and said structure; and a pick-up mounted on said structure having an alternating signal at its output, when energized, of a frequency equal to the resonant frequency of said structure.

4. The invention as defined in claim 3, wherein said housing has a thermal coefficient of expansion that is different from at least one of the thermal coefficients of expansion of said second and third members, respectively.

5. The invention as defined in claim 4, wherein the ratio of the mass of said second member to that of said third member is greater than unity.

6. The invention as defined in claim 5, wherein said housing is nonmagnetic, said second and third members being magnetic, a hollow cylindrical magnetic sleeve being fixed around said coil inside said housing, said sleeve having one end located contiguous to said second member, and a magnetic washer attached rigidly to said housing around and contiguous to, but spaced from, said third member, said washer extending radially in all directions from a position contiguous to the edge of the other end of said sleeve toward said third member.

7. The invention as defined in claim 4, wherein said housing is nonmagnetic, said second and third members being magnetic, a hollow cylindrical magnetic sleeve being fixed around said coil inside said housing, said sleeve having one end located contiguous to said second member, and a magnetic washer attached rigidly to said housing around and contiguous to, but spaced from, said third member, said washer extending radially in all directions from a position contiguous to the edge of the other end of said sleeve toward said third member.

8. The invention as defined in claim 3, wherein the ratio of the mass of said second member to that of said third member is greater than unity.

9. The invention as defined in claim 8, wherein said housing is nonmagnetic, said second and third members being magnetic, a hollow cylindrical magnetic sleeve being fixed around said coil inside said housing, said sleeve having one end located contiguous to said second member, and a magnetic washer attached rigidly to said housing around and contiguous to, but spaced from, said third member, said washer extending radially in all directions from a position contiguous to the edge of the other end of said sleeve toward said third member.

10. The invention as defined in claim 3, wherein said structure includes a generally rectangular flat vane having a thickness small in comparison to its length and width, said vane being fixed at two opposite parallel edges to a hollow inner cylinder approximately at two respective diametrically opposite axial lines on the inner cylindrical surface thereof, said inner cylinder having a substantially uniform wall thickness around its circumference and along its length, an outer right cylinder around said inner cylinder, said outer cylinder being attached rigidly to said housing and having concentric internal and external cylindrical surfaces, the unstressed inside diameter of said outer cylinder being less than the unstressed outside diameter of said inner cylinder such that said inner and outer cylinders have an interference fit when they are both at the same temperature, said pick-up being a piezoelectric crystal fixed between said cylinders at one edge of said vane midway along the length thereof, said third member including a body having a cylindrical external surface with an axis of symmetry perpendicular to the plane at said vane and intersecting said vane at its center, said sleeve having a hole through the wall thereof defined by a cylindrical surface into which said one end of said third member is slidably positioned upon assembly, said coil being fixed relative to said third member, said spring means including a Belleville spring having parallel frustoconical surfaces defined between parallel planes perpendicular to the axis thereof, said first member having a first surface facing said second member, said first member having a cylindrical internal surface, said second member having a projection with an external cylindrical surface, said projection extending at least part way into said hole, said first member internal surface and said second projection external surface being concentric and having the same said axis of symmetry, the outside diameter of said projection being slightly less than the minimum inside diameter of said spring, said projection extending through said spring, said first member having an annular notch in which the outer annular edge of said spring is fixedly located.

* * * * *